United States Patent [19]

Wade et al.

[11]  4,360,623

[45]  Nov. 23, 1982

[54] ALKALI METAL BOROHYDRIDE CONCENTRATE USEFUL AS A STABILITY IMPROVER

[75] Inventors: Robert C. Wade, Ipswich; Lawrence J. Guilbault, Topsfield; Nuno M. Rei, Boxford, all of Mass.

[73] Assignee: Thiokol Corporation, Newtown, Pa.

[21] Appl. No.: 272,868

[22] Filed: Jun. 12, 1981

[51] Int. Cl.$^3$ .......................... C08K 3/38; C08L 23/12
[52] U.S. Cl. ..................................... 524/404; 524/236; 525/337
[58] Field of Search ....................... 260/42.56, 45.7 R; 564/8; 524/404; 525/337

[56] References Cited

U.S. PATENT DOCUMENTS

| | | | |
|---|---|---|---|
| 2,738,369 | 3/1956 | Banus et al. | 564/8 |
| 2,942,935 | 6/1960 | King et al. | 564/8 |
| 3,372,140 | 3/1968 | Witt | 260/45.7 R |
| 3,413,260 | 11/1968 | Arrigo | 260/45.7 R |
| 3,503,922 | 3/1970 | Carton | 260/42.56 |
| 3,679,646 | 7/1972 | Bristol | 525/337 |
| 4,116,909 | 9/1978 | Muller | 260/42.56 |
| 4,161,419 | 7/1979 | Alia | 260/42.56 |
| 4,244,854 | 1/1981 | Massara | 260/42.56 |

Primary Examiner—John Kight, III
Assistant Examiner—R. A. White
Attorney, Agent, or Firm—Gerald K. White

[57] ABSTRACT

Concentrates containing from 0.5% to 20% by weight of an alkali metal borohydride, balance essentially inert dry resinous polymer are added to plastics in amounts effective to reduce traces impurities and thereby result in improved heat and light stability.

7 Claims, No Drawings

ALKALI METAL BOROHYDRIDE CONCENTRATE USEFUL AS A STABILITY IMPROVER

BACKGROUND OF THE INVENTION

The use of alkali metal containing borohydrides as a purification agent to prevent deterioration of plastics due to heat or light is known. For example, U.S. Pat. Nos. 3,372,140 and 3,413,260 discuss the use of certain borohydrides, such as quaternary ammonium borohydrides, that are soluble in the plastic. However, the use of inorganic borohydrides such as alkali metal borohydrides in this result has been hampered due to the lack of solubility and dispersibility. This problem is also pointed out in the U.S. Pat. No. 3,413,260 patent. This application obviates such long standing dispersion problem with use of a stable borohydride concentrate.

While quaternary ammonium borohydrides have greater solubility than alkali metal borohydrides, the former suffer from lack of thermal stability at the elevated temperatures used in processing plastics. A further disadvantages of such quaternary compounds is that their hydride equivalent weights are higher than the alkali metal borohydrides, therefore requiring higher amounts. Also, the quaternary compunds are more expensive.

As mentioned previously, the use of alkali metal borohydrides such as sodium and potassium borohydride as purification aids and stabilizers for polymers is known. In such application, borohydrides function by reducing oxidized impurities or functional groups that are present in the polymer as manufactured, or form as the result of photochemical and oxidative processes during end use of articles fabricated from the polymer. Elimination or reduction of those impurities and prevention of their formation during end use of the polymer improves the color, odor, stability and service life of the end use fabricated articles.

Polymers can be treated with alkali metal borohydrides during the polymerization process, or subsequent to this by post-treatment of the polymer in solution or in the bulk, molten state. For example, U.S. Pat. No. 3,086,963 describes the stabilization of polyvinylalcohol against thermally induced discoloration by treating an aqueous or organic solution of the polymer with sodium borohydride. Treatment of cellulosic film with aqueous solutions of alkali metal borohydrides to improve oxidation resistance is described in U.S. Pat. No. 3,091,554.

Alkali metal borohydride treatment during the polymerization process is described for PVC in Swedish Patent 350,975; for poly(methylmethacrylate) in Japanese Pat. No. 73,15,473; for Nylon-6 in Belgium Pat. No. 622,701; and for styrene/phenolic resins in Japanese Pat. No. 72,41,102.

The treatment of bulk, molten polymers with alkali metal borohydrides during melt processing is more difficult due to the low solubility and agglomeration tendency of the alkali metal borohydrides in many polymers and the propensity for borohydride hydrolysis by reaction with adventitious moisture at the melt processing temperature. Thus, Japanese patent application No. 10,567 describes the treatment of polyethylene with alkali metal borohydrides during melt extrusion to reduce oxidized impurities and improve the odor of the molded plastic article.

Thus, it may be seen that while there are many potential advantages to employing alkali metal borohydrides as stabilizers and purification aids during molt processing of thermoplastic resins, practical use of alkali metal borohydrides in this application have heretofore been limited by the difficulty of incorporating these compounds into the molten thermoplastic resins due to poor solubility, the tendency to agglomerate and the propensity towards hydrolysis by reaction with adventitious moisture.

SUMMARY OF THE INVENTION

The invention involves the incorporation of a stable borohydride concentrate mixture comprising from about 0.5% to 20% by weight alkali metal borohydride, less than about 0.1% adsorbed water, balance inert dry resinous polymer into plastics that are susceptible to deterioration due to heat or light during processing, preferably while the plastic is molten. The concentrate should contain no more than about 0.1% adsorbed water or the borohydride will hydrolyze. Such water may be adsorbed on the surface of the borohydride and/or on the surface of the inert resinous polymer. Such concentrate is added to the plastic by conventional techniques during processing in amounts effective to produce the requisite stabilization improvement. The alkali metal borohydride functions to reduce trace impurities such as aldehydes, ketones, hydroperoxides, peroxides, and metal ions in the plastic, thereby improving the heat and light stability of the plastic. The concentrate plastic mixture should be characterized by the substantial absence of reactive protonic materials so as to avoid hydrolysis of the borohydride and consequent foaming of the plastic.

DETAILED DESCRIPTION OF THE INVENTION

The concentrates of the invention may be used to incorporate relatively low levels of alkali metal borohydrides into plastics during processing with the object of using the incorporated borohydride as a reductive purifying agent and thereby enhancing heat and light stability of the plastic.

The use of concentrates to incorporate low levels of borohydride into plastics has several advantages. First of all, the concentrates protect the borohydride from adventitious hydrolysis during handling and may be stored for periods on the order of one year without the occurrence of significant hydrolysis. Secondly, it is much easier to incorporate the borohydride at very low levels such as less than 1 wt.% into the plastic by using the concentrates. Thirdly, overall handling such as weighing and making uniform mixtures is much easier using the concentrates than using neat borohydride. Because such highly reactive material has been concentrated and rendered substantially inert, employee safety is enhanced. In addition, very uniform dispersions of borohydride in the resin are obtained using the concentrates.

The stable borohydride concentrate comprises from about 0.5% to 20% by weight of an alkali metal borohydride, less than about 0.1% adsorbed water, balance being essentially dry inert resinous polymer. The 0.5% lower limit for borohydrides was selected primarily because lower concentrations would necessarily involve the use of excessive amounts of the concentrate and the 20% upper limit was selected because higher levels would require excessively small amounts of the concentrate and thereby hamper the attainment of uniform dispersion in the plastic. It is preferred to include the alkali metal borohydride in amounts between 1 and 5%, because such range permits let-down ratios on the order of about 20:1 as are normally desired in the industry. Sodium and potassium borohydrides are contemplated for use in connection with the invention. The concentrate should contain no more than about 0.1% by weight of adsorbed water, preferably not more than about 0.01%, in order to prevent hydrolysis of the borohydride. Thus, the borohydride and resin must be very dry when mixed to form the concentrate and moisture pick-up should be avoided during such mixture.

The inert resinous polymer component of the concentrate comprises resins in which reactive protonic hydrogen atoms are substantially absent. Such resins include polyolefins, polydienes, polystyrene, polyphenyleneoxidestyrene, polyacrylates, polyvinylchloride, polyvinylacetate, and the like.

The alkali metal borohydride concentrates of the invention are prepared by dry blending from about 0.5% to 20% by weight of the borohydride with the inert resinous polymer to form a dry mixture thereof. The mixture should contain less than about 0.1% of adsorbed water. The mixture is then treated at a temperature in excess of the melting point of the resin, extruded, cooled, and formed into pellets by conventional techniques such as chopping, grinding and the like.

A definition of plastic which seems to be accepted in the industry is that plastic comprises a large and varied group of materials which consist of or contain as an essential ingredient, a substance of high molecular weight which, while solid in the finished state, at some stage in its manufacture is soft enough to be formed into various shapes, usually through the application, either singly or together, of heat and pressure. Plastic generally is prepared by the condensation or polymerization of a single monomer or of a mixture of monomers. The plastic further may be classified as thermosetting or thermoplastic. Most, if not all, plastics undergo deterioration upon exposure to UV light and/or heat and the present invention provides a novel method of inhibiting such deterioration.

In one embodiment the plastic comprises a solid olefin polymer. This may comprise homopolymers or copolymers of olefinic hydrocarbons including particularly polyethylene, propylene and polybutylene, as well as copolymers of ethylene and propylene, ethylene and butylene and propylene and butylene. In addition, solid polymers prepared from one or more higher molecular weight olefins may be stabilized in accordance with the present invention.

Another plastic available commercially on a large scale is polystyrene. Polymerization of styrene proceeds rapidly in an emulsion of 5% sodium oleate solution and results in high molecular weight polmers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, autombile panels, molded household articles, etc. One disadvantage of polystyrene is its tendency to deteriorate when exposed to direct sunlight for extended periods of time.

Another class of plastics available commercially is broadly classed as vinyl resins and is derived from monomers such as vinyl chloride, vinyl acetate, vinyldine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidene chloride, alkyl acrylates, alkyl methacrylates, alkyl maleates, alkyl fumarates, etc.

Other plastics being used commercially on a large scale are in the textile class and include polyamides, Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), etc. Here again, deterioration of the solid polymer occurs due to ultraviolet light.

Still other plastics are prepared from other monomers and are available commercially. Illustrative examples of such other solid polymers include phenol-formaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale.

In use, the alkali metal borohydride concentrate is blended with a substantially dry thermoplastic resin in pellet or powder form at a ratio to provide the desired alkali metal borohydride concentration, generally in the range of 0.01 to 1.00 weight percent alkali metal borohydride, based on the weight of thermoplastic. The resulting dry blend is then melt processed by conventional methods such as extrusion, injection molding, colandering etc. to uniformly disperse the alkali metal borohydride in the molten thermoplastic resin and obtain the desired stabilization and purification effects. Typical finished product forms include moldings, castings, fibers, films, sheets, rods, tubing, and like products.

The following examples serve to further illustrate the practice of the invention.

EXAMPLE 1

Sodium borohydride was concentrated in polypropylene by the following procedure. Ninety parts by weight of previously dried, powdered, unstabilized polypropylene resin (melt index 12) and 10 parts by weight of $NaBH_4$ that was previously dried 24 hrs at 100° C., were thoroughly mixed in a dry blender. The resultant mixture was extruded through a ⅛ inch diameter die at about 450° F. The extruded rod was pelletized in line with the extruder. The extruded concentrate was examined with a low power microscope and an extremely uniform dispersion of minute borohydride particles was found. Virtually no gas bubbles were observed in the resin pellets.

EXAMPLE 2

Sodium borohydride was concentrated in NORYL resins in the following manner. Ninety parts by weight of dry NORYL resin FN 215, a proprietary General Electric Co. blend of polyphenylene oxide and polystyrene in pellet form, was mixed with 0.1 part by weight of mineral oil and 10 parts by weight of $NaBH_4$ powder, that was previously dried at 100° C. for 8 hrs. The resultant dry blended mixture was then extruded at about 450° F. and pelletized as described in the previous example. The concentrate pellets were equivalent to the pellets of Example 1.

EXAMPLE 3

Sodium borohydride was concentrated in polystyrene with use of the following procedure. Ninety parts by weight of previously dried high impact polystyrene pellets was blended with 0.1 part of mineral oil and 10 parts by weight of dry NaBH$_4$ powder. The resultant mixture was then extruded at about 450° F. and pelletized as described in Example 1. As in Example 1, an excellent dispersion of minute particles of NaBH$_4$ in the resin was produced with virtually no gas bubbles observed.

EXAMPLE 4

Sodium borohydride was concentrated in polypropylene according to the following procedure. Fifty pounds of unstabilized polypropylene identified by the name Hercules PROFAX 6301 was predried for 12 hours under vacuum. A 1.25 pound quantity of sodium borohydride was added to the polypropylene and tumble mixed for 10 minutes. The resultant mixture was redried as above and subsequently extruded and pelletized as in Example 1 to produce polypropylene pellets containing 2.5% sodium borohydride. Examination of the pellets with a low power microscope showed an extremely uniform dispersion of minute sodium borohydride particles and virtually no gas bubbles. The pellets exhibited no evidence of sodium borohydride hydrolysis and gas evolution during storage in an open container, or upon addition of the pellets to water.

EXAMPLE 5

The improved dispersibility and ease of incorporating an alkali metal borohydride into a thermoplastic resin by use of the alkali metal borohydride concentrate was demonstrated as follows. Dry blends of unstabilized polypropylene containing 0.05 and 0.10% sodium borohydride were prepared using neat sodium borohydride powder and the 2.5% sodium borohydride concentrate in polypropylene of Example 4. Polypropylene film was extruded from each dry blend. Visual examination of the resulting film samples showed that those prepared using neat sodium borohydride powder at the 0.05 and 0.10% levels contained numerous bubbles and agglomerated particles of sodium borohydride, resulting from hydrolysis and poor dispersion of the neat sodium borohydride in the thermoplastic resin. Visual examination of the film samples containing 0.05 and 0.10% sodium borohydride that was added in the form of the 2.5% sodium borohydride concentrate of Example 4 exhibited no signs of gas bubbles or agglomerated particles. A very uniform dispersion of minute sodium borohydride particles was discovered upon microscopic examination.

EXAMPLE 6

The effectiveness of the 2.5% sodium borohydride concentrate of Example 4 as a stabilizer and purification aid for polypropylene was demonstrated as follows. Extruded film samples of unstabilized polypropylene (Hercules' PROFAX 6301) containing 0.1% sodium borohydride were added in the form of the 2.5% sodium borohydride concentrate of Example 4, and control film samples of unstabilized polypropylene containing no sodium borohydride were subjected to accelerated aging in Weather-Ometer and Q-Panel environmental weathering cabinets. The control films and sodium borohydride treated films were examined periodically for signs of degradation during accelerated aging as observed by yellowing and embrittlement. The test results are shown in Table 1.

TABLE 1

| | Sodium Borohydride Stabilization of Polypropylene Film Condition After Accelerated Aging | |
|---|---|---|
| Stabilizer | Weather-Ometer | Q-Panel |
| None | Yellow and brittle after 300 hours exposure | Yellow and brittle after one week exposure |
| 0.1% NaBH$_4$ | Colorless and flexible after 500 hours exposure | Colorless and flexible after two weeks exposure |

As may be observed from the data in Table 1, the sodium borohydride concentrates functioned to enhance stability.

We claim:

1. A process for purifying plastic during processing to enhance resistance to deterioration caused by heat or light, comprising:
    adding an effective amount of a stable, substantially inert, alkali metal borohydride concentrate consisting essentially of from about 0.5% to 20% by weight alkali metal borohydride, less than about 0.1% adsorbed water, balance essentially dry inert resinous polymer to a plastic during processing of said plastic so as to reduce trace impurities contained in said plastic that cause deterioration of said plastic due to heat or light to a level effective to improve heat or light stability of said plastic.

2. The process of claim 1, wherein:
    said plastic is molten when said concentrate is added.

3. The process of claim 1, wherein:
    said alkali metal borohydride is included in said concentrate in an amount from about 1% to 5% by weight.

4. The process of claim 1, wherein:
    said alkali metal borohydride is a member selected from the group consisting of sodium borohydride or potassium borohydride.

5. The process of claim 1, wherein:
    said inert resinous polymer is a member selected from the group consisting of polyolefins, polydienes, polystyrene, polyphenylene oxide-styrene, polyacrylates, polyvinylchloride, or polyvinylacetate.

6. The process of claim 1, wherein:
    said alkali metal borohydroxide is sodium borohydride.

7. The process of claim 1, wherein:
    said alkali metal borohydride is added to said plastic in an amount no more than about 0.01% to 1.0% by weight.

* * * * *